United States Patent [19]

Saunders

[11] Patent Number: 4,589,735
[45] Date of Patent: May 20, 1986

[54] CHOLESTERIC LIQUID CRYSTAL MIRROR WITH SAFETY FEATURES

[75] Inventor: Frances C. Saunders, Malvern Wells, England

[73] Assignee: The Secretary of State for Defence in Her Britannic Majesty's Government of the United Kingdom of Great Britain and Northern Ireland, Great Britain

[21] Appl. No.: 786,352

[22] Filed: Oct. 11, 1985

Related U.S. Application Data

[63] Continuation of Ser. No. 542,609, Oct. 17, 1983, abandoned.

[30] Foreign Application Priority Data

Oct. 20, 1982 [GB] United Kingdom ............... 8229991

[51] Int. Cl.⁴ ............................................. G02F 1/133
[52] U.S. Cl. ....................................... 350/338; 350/280; 350/346
[58] Field of Search ............................ 350/278–280, 350/283, 331 R, 341, 346

[56] References Cited

U.S. PATENT DOCUMENTS

| | | | |
|---|---|---|---|
| 3,834,792 | 9/1974 | Janning | 350/341 |
| 3,862,798 | 1/1975 | Hopkins | 350/331 R X |
| 4,104,627 | 8/1978 | Thuler | 350/338 X |
| 4,136,933 | 1/1979 | Adams et al. | 350/341 |
| 4,146,656 | 3/1979 | Kinugawa et al. | 350/341 X |

FOREIGN PATENT DOCUMENTS

| | | |
|---|---|---|
| 1554133 | 1/1978 | United Kingdom . |
| 1604123 | 5/1978 | United Kingdom . |
| 2007865 | 10/1978 | United Kingdom . |
| 2029343 | 3/1980 | United Kingdom ............... 350/279 |

Primary Examiner—John K. Corbin
Assistant Examiner—David Lewis
Attorney, Agent, or Firm—Cushman, Darby & Cushman

[57] ABSTRACT

The reflectance of a mirror is variable to provide a dipping car mirror. The mirror comprises a liquid crystal cell formed by two transparent slides coated on their inner surfaces with electrodes. The front electrode is transparent while the rear one is a reflector or a separate reflecting surface is provided. Between the slides is a layer 8 to 12 μm thick of a cholesteric liquid crystal material. The slides are surface treated to give a high tilt homogeneous boundary condition, i.e. the liquid crystal molecules at the slide wall incline at a high (20°–75°) tilt to the surface. A control unit applies either a high voltage (10 volts at 1 kHz) or a low voltage (1 to 2 volts at 1 kHz). The high voltage results in the liquid crystal adopting a light transmissive state. In this state light reflects off the rear of the cell. The low voltage state is a scattering state for the liquid crystal material. In the scattering state light reflects off the front slide and is about 1/10 that reflected off the rear electrode. A photocell controls the switching of the cell. With zero voltage across the cell the liquid crystal material adopts a light transmitter state.

4 Claims, 2 Drawing Figures

CHOLESTERIC LIQUID CRYSTAL MIRROR WITH SAFETY FEATURES

This is a continuation of application Ser. No. 542,609, filed Oct. 17, 1983, which was abandoned upon the filing hereof.

FIELD OF THE INVENTION

This invention concerns liquid crystal mirror displays in which the reflectance of a mirror is varied by a liquid crystal cell.

BACKGROUND OF THE INVENTION

A typical liquid crystal display cell comprises two glass slides spaced about 12 $\mu$m apart and containing a layer of a liquid crystal material. Electrode structures on the inner face of the glass slides enable an electric field to be applied across the liquid crystal layer. Application of an appropriate voltage causes a molecular re-alignment of the liquid crystal molecules. This cell ON-state is visibly different from the zero voltage cell OFF-state and forms the basis for different types of displays.

Car mirrors are known that "dip" to reduce their reflectance during night time driving. Such mirrors utilize a movable wedge. Dipping mirrors incorporating liquid crystal displays have been made using negative dielectric anisotropy material in a dynamic scattering mode. This liquid crystal material can adopt two states; a clear transparent cell OFF-state and a light scattering cell ON-state. In the OFF-state light is reflected off a mirror behind the cell. In the ON-state a much smaller amount of light is reflected off the cell front surface. This known driving mirror has disadvantages in that the liquid crystal material has insufficient chemical stability and operating temperature range. As a result it is difficult and expensive to make.

SUMMARY OF THE INVENTION

According to the present invention a dipping mirror utilizes a phase change effect with optimized cell boundary conditions so that it has three allowed states namely a clear state with a high applied voltage, a scattering low voltage state, and a clear zero voltage state.

According to this invention a dipping mirror comprises a liquid crystal cell with a highly reflecting rear surface, the cell comprising a transparent front slide and a rear slide spaced apart by a spacer to contain a layer of a cholesteric liquid crystal material having a positive dielectric anisotrophy, a transparent electrode structure on the front slide, and an electrode structure on the rear slide, the facing surfaces of both slides having a surface treatment that produces a high tilt of the liquid crystal molecules in contact therewith.

The tilt may be 20° to 75°, preferably 25° to 30°, from the slide surface.

The rear electrode and highly reflecting rear surface may be one and the same or separate layers.

BRIEF DESCRIPTION OF THE DRAWINGS

The invention will now be described, by way of example only, with reference to the accompanying drawings of which.

DETAILED DESCRIPTION OF THE INVENTION

Figure 1:
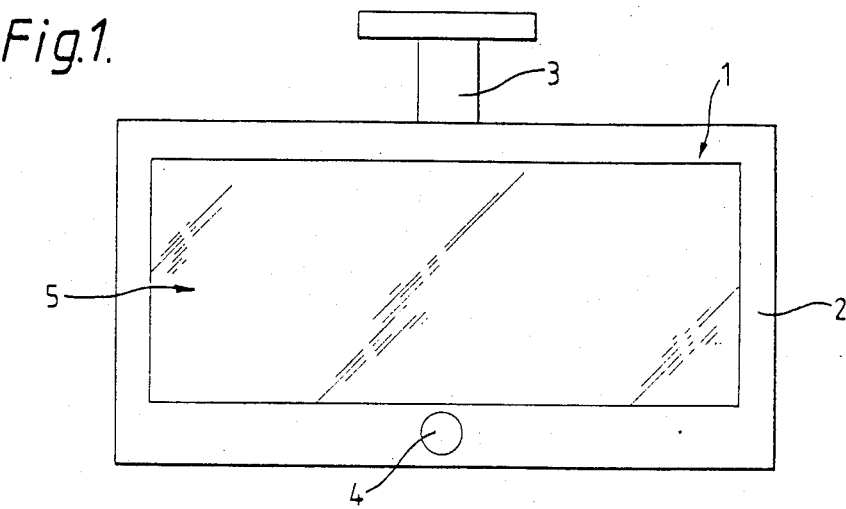
FIG. 1 is a front view of a dipping mirror.
Figure 2:
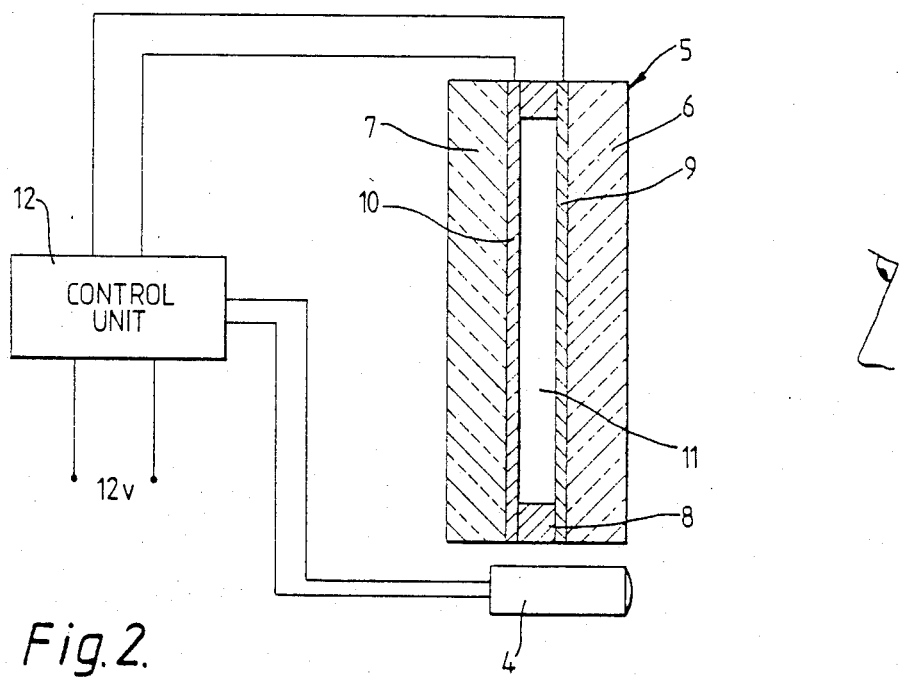
FIG. 2 is a diagrammatic sectional view of FIG. 1 together with an electrical circuit for operating the dipping.

As shown in FIGS. 1 and 2, a dipping mirror 1 comprises a frame 2 with a bracket 3 for mounting to a car. The frame 2 carries a photo cell 4 and a liquid crystal cell 5.

This cell 5 comprises a front 6 and a rear 7 glass slide spaced 6 to 12 $\mu$m apart by a spacer 8. The front slide 6 carries a transparent tin oxide sheet electrode 9 while the back slide is silvered to form a mirror finish back sheet electrode 10. The mirror may be a layer of aluminum evaporated onto the slide 7. Between the slides 6, 7 is a layer 11 of cholesteric liquid crystal material; for example a mixture of E43 (nematic) and 5% by weight of CB 15 (cholesteric), both available from B.D.H. Poole, Dorset, England. This mixture has a cholesteric pitch of about 1 $\mu$m and has a positive dielectric anisotropy.

Prior to assembly the slides 6, 7 are surface treated by evaporating silicon monoxide at a grazing angle of about 5° onto the inner surface. This gives a high tilt homogenous boundary condition, i.e. liquid crystal molecules in contact with the slide 6, 7 are inclined at about 25° to 30° to the surface.

Electric signals at about 1k Hz are supplied from a control unit 12 which receives power at 12 volts D.C. from a car battery (not shown). Output from the photo cell 4 is to the control unit 12.

In a zero applied voltage state the liquid crystal layer 11 is transparent. Light is reflected off the mirror electrode 10. This transparency is due to the high tilt surface condition.

Application of a high voltage, 10 volts at 1 kHz, causes the liquid crystal molecules to align parallel to the applied field. This also gives a transparent layer 11 and is the normal operating condition.

Application of a low voltage, 1 to 2 volts, causes the liquid crystal molecules to collectively adopt scattering positions, somewhere between the zero voltage and high voltage condition. In this condition no light passes to the mirror electrode 10. However specular reflection occurs off the front surface of the front slide 6. This specular reflection is about one tenth that of reflection from the mirror electrode 10.

When operated in a car the mirror 1 is maintained in the fully reflecting mode by continuous application of the high voltage. Current consumption is extremely low since the cell is effectively a capacitor.

Intense light e.g. from a following car causes the photo cell 4 to signal the control unit 12 to drop the applied voltage to about 2 volts. This switches the cell 5 to a scattering condition in a few microseconds. When the intense light is removed the photo cell 4 signal drops and the 10 volts is re-applied. A clear state occurs within a few milliseconds.

Should a fault occur and no voltage is applied to the cell 5 the liquid crystal layer 11 relaxes to the transparent state in about 2 to 3 minutes. This provides a fail safe operation for day time use.

In a different embodiment both electrodes are transparent. A mirror surface is provided on the rear surface of the rear slide 7.

Another embodiment incorporates a switch 13 so that the dipping can be effected manually. This switch 13 can supplement or replace the photocell 4.

I claim:

1. A variable reflectance mirror comprising:

a transparent front slide;
a rear slide;
a spacer for spacing apart said front and rear slides;
a layer of a cholestric liquid crystal material having a positive dielectric antisotrophy contained in the space formed by said spacer between said front and rear slides;
a transparent electrode structure on said front slide;
an electrode structure on said rear slide;
a highly reflecting surface on said rear slide;
the facing surfaces of both slides having a surface treatment that produces a tilt to the liquid crystal molecules in contact with said surface, said tilt being substantially between 20° and 75°; and
voltage control means for applying at least two discrete non-zero voltage levels to the cell electrodes including applying a first voltage level to the cell electrodes in order to rapidly establish a light transmissive state in said liquid crystal layer and applying a second voltage level, lower than said first voltage level, to the cell electrodes in order to rapidly establish a light scattering state in said liquid crystal layer, said voltage control means when not applying voltage to the cell electrodes results in said liquid crystal layer slowly relaxing to said light transmissive state.

2. The mirror of claim 1 wherein the high tilt is substantially in the range of 25° to 30°.

3. The mirror of claim 1 further comprising a switch for manually switching said voltage control means between said first and second predetermined voltages.

4. The mirror of claim 1 further comprising a photo detector for measuring light received by the mirror and operating said voltage control means to switch between said first and second predetermined voltages.

* * * * *